United States Patent
Kneckt et al.

(10) Patent No.: US 11,817,958 B2
(45) Date of Patent: Nov. 14, 2023

(54) MAC-BASED HYBRID AUTOMATIC REPEAT REQUEST (HARQ)

(71) Applicant: Apple Inc., Cupertino, CA (US)

(72) Inventors: Jarkko L. Kneckt, Los Gatos, CA (US); Yong Liu, Campbell, CA (US); Jinjing Jiang, San Jose, CA (US); Su Khiong Yong, Palo Alto, CA (US); Tianyu Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/996,139

(22) Filed: Aug. 18, 2020

(65) Prior Publication Data
US 2021/0075551 A1    Mar. 11, 2021

Related U.S. Application Data

(60) Provisional application No. 62/896,456, filed on Sep. 5, 2019.

(51) Int. Cl.
*H04L 1/1812* (2023.01)
*H04W 52/02* (2009.01)
*H04L 1/1607* (2023.01)

(52) U.S. Cl.
CPC .......... *H04L 1/1812* (2013.01); *H04L 1/1628* (2013.01); *H04W 52/02* (2013.01)

(58) Field of Classification Search
CPC ... H04L 1/1607; H04L 1/1887; H04L 1/1883; H04L 47/746
See application file for complete search history.

(56) References Cited

U.S. PATENT DOCUMENTS

| | | | |
|---|---|---|---|
| 6,629,261 B1 * | 9/2003 | Chintada | H04L 1/1809 714/704 |
| 9,876,614 B1 | 1/2018 | Sun et al. | |
| 10,091,783 B2 * | 10/2018 | Barriac | H04W 72/542 |
| 10,306,704 B1 * | 5/2019 | Wang | H04L 47/781 |

(Continued)

FOREIGN PATENT DOCUMENTS

| | | |
|---|---|---|
| CN | 1750438 A | 3/2006 |
| CN | 101005334 A | 7/2007 |

(Continued)

OTHER PUBLICATIONS

Supplementary European Search Report, directed to related European Patent Application No. 20192709.2, dated Feb. 4, 2021; 10 pages.

(Continued)

*Primary Examiner* — Khaled M Kassim
*Assistant Examiner* — Berhanu D Belete
(74) *Attorney, Agent, or Firm* — Sterne, Kessler, Goldstein & Fox P.L.L.C.

(57) ABSTRACT

Some embodiments of this disclosure include apparatuses and methods for a media access control (MAC) level operation that enables a transmitter and a receiver to select low-density parity check (LDPC) codewords that are HARQ retransmitted. The operations described herein provide for reducing the number of codewords that need to be retransmitted, minimizing the overhead needed to signal the feedback from a receiver to a transmitter, and allowing a transmitter to control which codewords are retransmitted.

20 Claims, 10 Drawing Sheets

(56) References Cited

U.S. PATENT DOCUMENTS

| | | | |
|---|---|---|---|
| 2002/0075841 A1 | 6/2002 | Steer et al. | |
| 2005/0226239 A1 | 10/2005 | Nishida et al. | |
| 2006/0035589 A1* | 2/2006 | Shvodian | H04L 1/1858 455/18 |
| 2006/0059399 A1 | 3/2006 | Hu et al. | |
| 2009/0175210 A1* | 7/2009 | Vijayan | H04L 1/0065 370/312 |
| 2011/0154144 A1* | 6/2011 | Nanda | H04L 1/1664 714/748 |
| 2011/0200016 A1* | 8/2011 | Bergman | H04L 1/1614 370/335 |
| 2011/0239075 A1 | 9/2011 | Xu et al. | |
| 2012/0001567 A1* | 1/2012 | Knapp | H04L 12/6418 315/291 |
| 2014/0050230 A1 | 2/2014 | Bao et al. | |
| 2014/0056223 A1* | 2/2014 | Quan | H04W 28/18 370/328 |
| 2014/0126580 A1 | 5/2014 | Sampath et al. | |
| 2015/0236818 A1* | 8/2015 | Qi | H04L 1/007 375/341 |
| 2016/0119811 A1 | 4/2016 | Merlin et al. | |
| 2016/0309480 A1* | 10/2016 | Verma | H04W 52/0216 |
| 2016/0365952 A1 | 12/2016 | Kim et al. | |
| 2017/0230149 A1* | 8/2017 | Wang | H04L 1/1614 |
| 2018/0035426 A1* | 2/2018 | Barriac | H04L 5/0055 |
| 2019/0281658 A1* | 9/2019 | Wang | H04L 1/1887 |
| 2019/0349141 A1 | 11/2019 | Ahn et al. | |
| 2020/0119859 A1* | 4/2020 | Wang | H04L 1/1819 |
| 2020/0137827 A1* | 4/2020 | Cariou | H04W 80/02 |
| 2020/0145139 A1* | 5/2020 | Merlin | H04L 1/1812 |
| 2020/0344006 A1* | 10/2020 | Shellhammer | H04L 1/0011 |
| 2020/0344007 A1* | 10/2020 | Chen | H04L 1/1864 |
| 2021/0006361 A1* | 1/2021 | Asterjadhi | H04W 74/0816 |

FOREIGN PATENT DOCUMENTS

| | | |
|---|---|---|
| CN | 101325474 A | 12/2008 |
| EP | 1638240 A1 | 3/2006 |
| EP | 1638241 A1 | 3/2006 |
| EP | 1 816 777 A2 | 8/2007 |
| WO | WO 2008/151498 A1 | 12/2008 |
| WO | WO 2011/003842 A1 | 1/2011 |
| WO | WO 2012/130050 A1 | 10/2012 |
| WO | WO 2015/006640 A1 | 1/2015 |
| WO | WO 2017/222749 A1 | 12/2017 |
| WO | WO 2018/124779 A1 | 7/2018 |

OTHER PUBLICATIONS

Chinese Application No. 202010880098.X, First Office Action dated Oct. 19, 2021; English Translation of Search Results from EPO Global Dossier, 21 pages.

* cited by examiner

100
MAC-BASED HYBRID AUTOMATIC REPEAT REQUEST (HARQ)

CROSS-REFERENCE TO RELATED APPLICATIONS AND INCORPORATION BY REFERENCE

This application claims priority to U.S. Provisional Application No. 62/896,456, filed Sep. 5, 2019, and entitled "MAC-Based Hybrid automatic repeat request (HARQ)," the content of which is hereby incorporated by reference in its entirety.

BACKGROUND

Field

The described embodiments generally relate to wirelessly transmitting data packets. For example, the embodiments of this disclosure relate to formatting data packets for transmission and retransmission.

Related Art

Hybrid automatic repeat request (HARQ) is a combination of high-rate forward error-correcting coding and ARQ error-control. In HARQ, a receiver receives low-density parity-check (LDPC) codewords (CWs), parses the content, and stores any failed CWs. The receiver then indicates to the transmitter which CWs were incorrectly received, and in response, the transmitter retransmits the failed CWs or additional LDPC encoding to the failed CWs back to the receiver. The receiver may then process the retransmitted CWs along with the stored failed CWs to verify whether the retransmitted CWs were correctly received. The retransmissions may continue until the codeword is received correctly or the maximum number of HARQ retransmissions is met.

SUMMARY

Some embodiments of this disclosure include apparatuses and methods for a media access control (MAC) level operation that enables a transmitter and a receiver to select low-density parity check (LDPC) codewords that are HARQ retransmitted. The operations described herein provide for reducing the number of codewords that need to be retransmitted, minimizing the overhead needed to signal the feedback from a receiver to a transmitter, and allowing a transmitter to control which codewords are retransmitted.

Some embodiments relate to a transmitting device. The transmitting device includes a transceiver configured to communicate over a wireless network and one or more processors communicatively coupled to the transceiver. The one or more processors are configured to: transmit, via the transceiver, a first data stream having a plurality of frames to a receiving device; receive, via the transceiver and from the receiving device, a block acknowledgement indicating which frames of the plurality of frames were correctly received; identify which frames from among the plurality of frames were unacknowledged in the block acknowledgement and are larger than a minimum size requirement; map any unacknowledged frames from the plurality of frames that are larger than the minimum size requirement to one or more codewords that carried the unacknowledged frames; determine whether to retransmit all of the one or more codewords, none of the one or more codewords, or a subset of the one or more codewords; and transmit, via the transceiver and to the receiving device, a second data stream based on the determination.

Some embodiments relate to a receiving device. The receiving device includes a transceiver configured to communicate over a wireless network and one or more processors communicatively coupled to the transceiver. The one or more processors are configured to: receive, via the transceiver, a first data stream having a plurality of data frames from a transmitting device; analyze the first data stream to determine whether the plurality of frames were properly received, wherein the receiving device is configured to acknowledge any frames that were received properly in a block acknowledgement; analyze the first data stream to determine whether any unacknowledged frames of the plurality of frames is larger than a minimum size requirement; store any codewords associated with the unacknowledged frames that are larger than the minimum size requirement; and transmit, via the transceiver and to the transmitting device, the block acknowledgement indicating which frames of the plurality of frames were correctly received.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
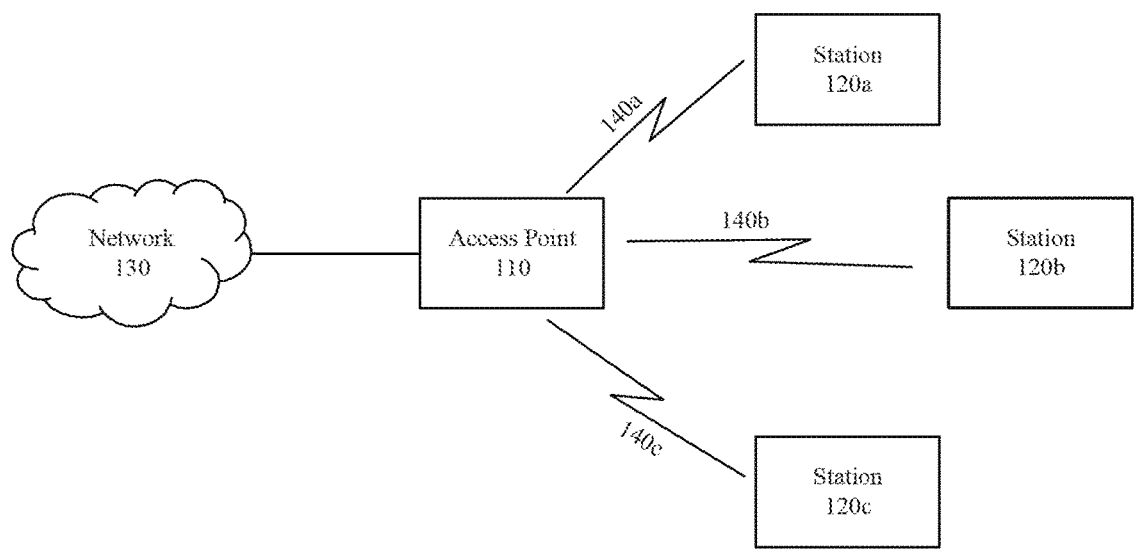
FIG. 1 illustrates an example system implementing a MAC-based HARQ, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatuses and methods for implementing a MAC-based HARQ. The MAC-based HARQ of this disclosure includes rules for defining when codewords should be retransmitted, formats for outgoing data streams to reduce the number of codewords to be retransmitted, and formats for block acknowledgements for reducing the number of retransmission requests.

According to some embodiments, the MAC-based HARQ can be implemented with communication techniques compatible with Institute of Electrical and Electronics Engineers (IEEE) 802.11 standards (such as, but not limited to IEEE 802.11ac, IEEE 802.11ax, IEEE 802.11bc, IEEE 802.11bd, IEEE 802.11be, etc.). For example, the MAC-based HARQ can be used within a wireless local area Network (WLAN).

FIG. 1 illustrates an example system 100 implementing a MAC-based HARQ, according to some embodiments of the disclosure. Example system 100 is provided for the purpose of illustration only and does not limit the disclosed embodiments. System 100 may include, but is not limited to, an access point (AP) 110, a plurality of stations (STA) 120a-c (collectively referred to as stations 120), and a network 130. The stations 120 may include, but are not limited to, Wireless Local Area Network (WLAN) stations, such as wireless communication devices, smart phones, laptops, desktops, tablets, personal assistants, monitors, televisions, wearable devices, and the like. The access point (AP) 110 may include but is not limited to WLAN electronic devices such as a wireless router, a wearable device (e.g., a smart watch), a wireless communication device (e.g., a smart phone), or a combination thereof. The network 130 may be the Internet and/or a WLAN. The stations 120 communications are shown as wireless communications 140a-c (collectively referred to as communications 140). Communication between the AP 110 and the stations 120 may take place using the wireless communications 140. The wireless communications 140 may be based on a wide variety of wireless communication techniques. These techniques can include, but are not limited to, techniques based on IEEE 802.11, IEEE 802.11ac, IEEE 802.11ax, IEEE 802.11bc, IEEE 802.11bd, IEEE 802.11be, IEEE 802.11v, etc. standards.

According to some embodiments, the AP 110 and stations 120 may be configured to implement a MAC-based HARQ. The AP 110 may be configured to communicate with the stations 120 that the AP 110 is capable of using and implementing the MAC-based HARQ. Also, the AP 110 may be configured to communicate to stations 120 parameters and/or rules associated with the MAC-based HARQ. For example, the AP 110 can use a Beacon frame, an association response, a probe response frame, an information element (IE), a new management frame, and/or other frames to send the parameters and/or rules associated with the MAC-based HARQ to the stations 120. For example, the AP 110 may transmit an add block acknowledgement (ADDBA) request to setup a block acknowledgement that allows the AP 110 to send Physical Layer Convergence Procedure (PLCP) protocol data unit (PPDUs) with aggregated MAC protocol data unit (MPDU) (A-MPDUs). The stations 120 may respond with an ADD Block Acknowledgement (ADDBA) response that provides station parameters for the block acknowledgement. Similarly, the stations 120 may send an ADDBA request to the AP 110, and in response, receive an ADDBA response from the AP 110 to enable the stations 120 to transmit A-MPDUs to the AP 110 and to receive a block acknowledgement from the AP 110. The ADDBA request and response frames may have parameters related to the HARQ operations described herein. For instance, these parameters may indicate whether the AP 110 and stations 120 should implement a HARQ format, a maximum number of stored code words, etc.

Figure 2:
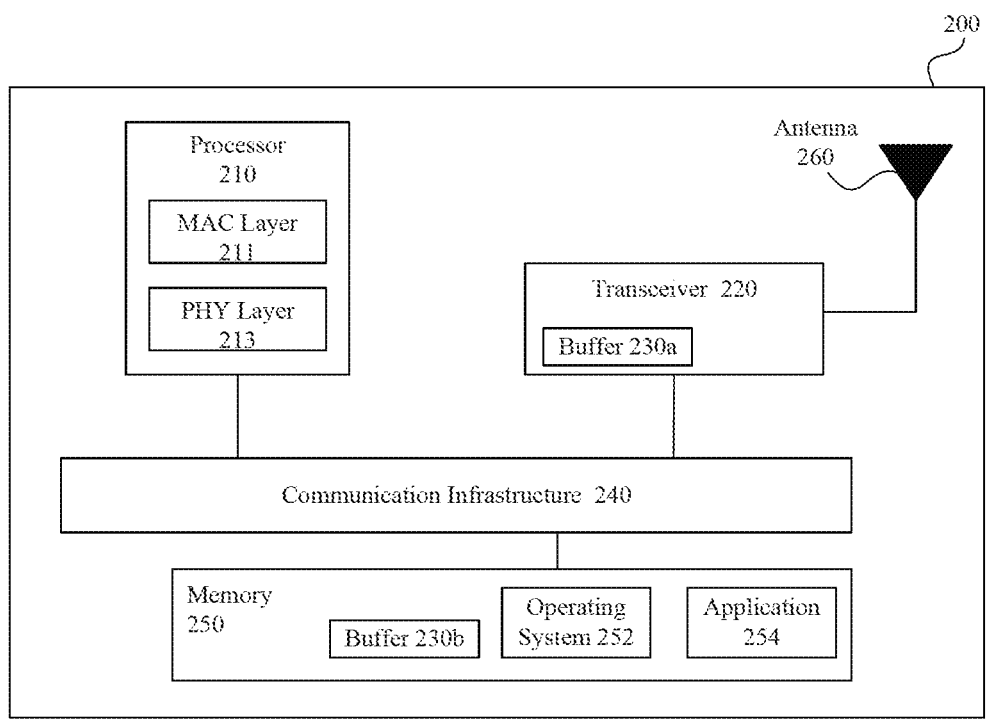
FIG. 2 illustrates a block diagram of an example wireless system of an electronic device, according to some embodiments of the disclosure.

FIG. 2 illustrates a block diagram of an example wireless system 200 of an electronic device implementing the MAC-based HARQ, according to some embodiments of the disclosure. The system 200 may be any of the electronic devices (e.g., AP 110, STA 120) of system 100. The system 200 includes processor 210, transceiver 220, buffer(s) 230a and 230b, communication infrastructure 240, memory 250, operating system 252, application 254, and antenna 260. The processor 210 may further include a MAC layer 211 and PHY layer 213, as should be understood by those of ordinary skill in the arts. The MAC layer 211 and PHY layer 212 can be implemented as computer instructions stored in an internal memory of processor 210, the external memory 250, or as state-machine that is "hard-wired" in processor 210. Illustrated systems are provided as exemplary parts of the system 200, and the system 200 may include other circuit(s) and subsystem(s). Also, although the systems of the system 200 are illustrated as separate components, the embodiments of this disclosure can include any combination of these, less, or more components.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 may be stored in the memory 250. The operating system 252 may manage transfer of data from the memory 250 and/or the one or more applications 254 to the processor 210 and/or the transceiver 220. In some examples, the operating system 252 may maintain one or more network protocol stacks (e.g., Internet protocol stack, cellular protocol stack, and the like) that can include a number of logical layers. At corresponding layers of the protocol stack, the operating system 252 includes a control mechanism and data structures to perform the functions associated with that layer.

According to some examples, the application 254 may be stored in the memory 250. The application 254 may include applications (e.g., user applications) used by the system 200 and/or a user of the system 200. The applications in the application 254 may include applications such as, but not limited to, Siri™, FaceTime™, radio streaming, video streaming, remote control, and/or other user applications.

Alternatively or in addition to the operating system, the system 200 may include the communication infrastructure 240. The communication infrastructure 240 may provide communication between, for example, the processor 210, the transceiver 220, and the memory 250. In some implementations, the communication infrastructure 240 may be a bus. The processor 210, e.g., the MAC layer 211, together with instructions stored in the memory 250 may perform operations enabling the system 200 to implement the MAC-based HARQ as described herein. Additionally or alternatively, the transceiver 220 may perform operations enabling the system 200 to implement the MAC-based HARQ as described herein.

The transceiver 220 may transmit and receive communications signals that support the MAC-based HARQ, according to some embodiments, and may be coupled to the antenna 260. The antenna 260 may include one or more antennas that may be the same or different types. The transceiver 220 allows the system 200 to communicate with other devices that may be wired and/or wireless. The transceiver 220 may include processors, controllers, radios, sockets, plugs, buffers, and like circuits/devices used for connecting to and communication on networks. According to some examples, the transceiver 220 may include one or more circuits to connect to and communicate on wired and/or wireless networks. The transceiver 220 may include a cellular subsystem, a WLAN subsystem, and/or a Bluetooth™ subsystem, each including its own radio transceiver and protocol(s) as will be understood by those skilled arts based on the discussion provided herein. In some implementations, the transceiver 220 may include more or fewer systems for communicating with other devices. According to some embodiments, the processor 210, alone or in combination with the memory 250, and/or the transceiver 220, implements the MAC-based HARQ, as described herein.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to IEEE 802.11ac, IEEE 802.11ax, IEEE 802.11bc, IEEE 802.11bd, IEEE 802.11be, etc.).

Figure 3:
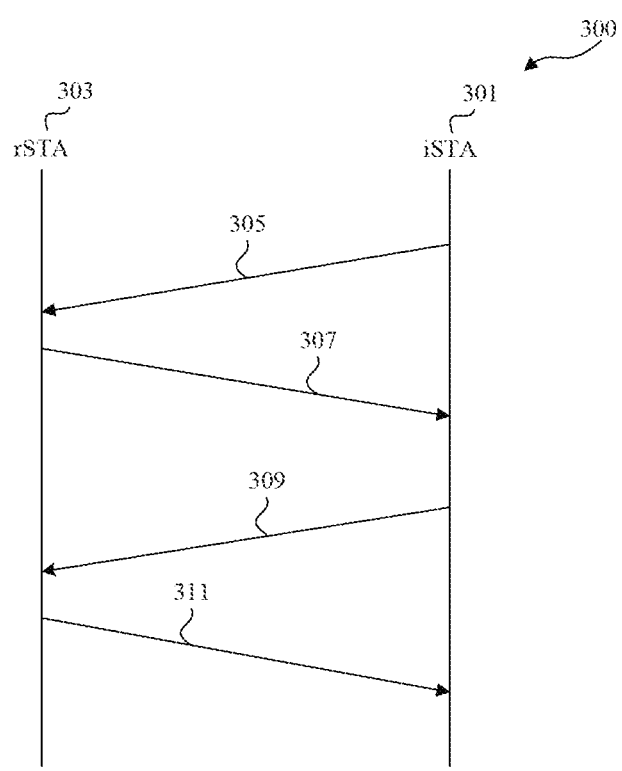
FIG. 3 illustrates example operations of communication between two electronic devices, according to some embodiments of the disclosure.

FIG. 3 illustrates example operations of communication between two electronic devices for the MAC-based HARQ, according to some embodiments of the disclosure. FIG. 3 may be described with regard to elements of FIG. 1. Operation 300 of FIG. 3 represents the communication between two electronic devices—initiating station (iSTA) 301 and responding station (rSTA) 303. According to some examples, iSTA 301 or rSTA 303 may be any one of STAs 120 and/or APs 110.

The iSTA 301 may transmit an initial data stream 305 to the rSTA 303. In general, the data communicated between iSTA 301 and rSTA 303 in the disclosed embodiments may be conveyed in packets or frames that are transmitted and received by radios in iSTA 301 and rSTA 303 in accordance with a communication protocol, such as an Institute of Electrical and Electronics Engineers (IEEE) 802.11 standard, Bluetooth™ (from the Bluetooth Special Interest Group of Kirkland, Wash.), a cellular-telephone communication protocol, and/or another type of wireless interface (such as a peer-to-peer communication technique, a mesh-network technique, and the like). Some of the embodiments are discussed with respect to a wireless local area Network (WLAN), but the embodiments of this disclosure are not limited to use with a WLAN. The communications between the TSTA 301 and rSTA 303 may include an initial (e.g. first) data stream 305, a block acknowledgement 307, a second data stream 309, and a second block acknowledgement 311, as shown in FIG. 3.

Figure 4:
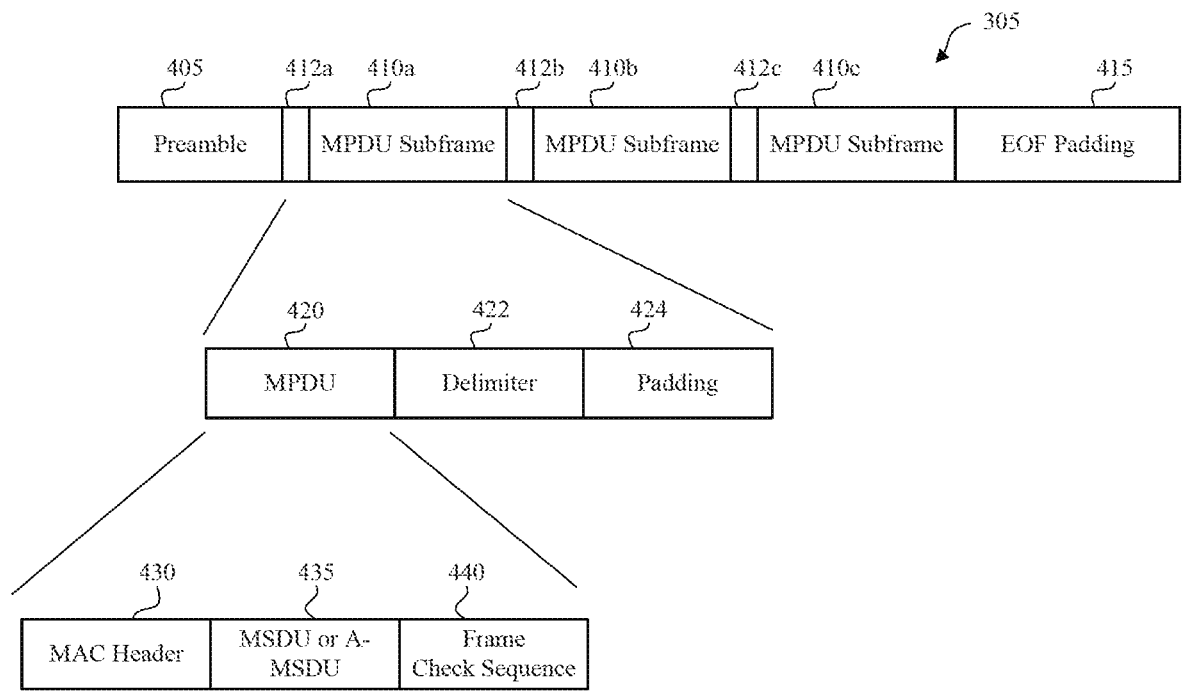
FIGS. 4-10 illustrate example frame field formats and associated codewords, according to some embodiments of the disclosure.

FIG. 4 illustrates an example frame format for the data stream 305, according to some embodiments of the disclosure. For example, FIG. 4 illustrates an exemplary format of physical layer convergence protocol data unit (PPDU). The PPDU may include packets and/or frames communicated between a station (e.g., STA 120a) and an access point (e.g., AP 110) or between two stations (e.g., STA 120a and STA 102b), or other packets and/or frames discussed herein, according to some examples. The PPDU may include a preamble 405, one or more MAC protocol data unit (MPDU) sub-frames 410a-c (collectively referred to MPDU sub-frames 410), aggregated MPDU (A-MPDU) headers 412a-c (collectively referred to A-MPDU headers 412), and optionally, end-of-frame (EOF) padding 415. The preamble 405 may include a physical layer preamble and/or physical layer header. The preamble 405 may include information used for carrier acquisition, synchronization, channel estimation, communicating frame specific parameters (e.g., coding rate, frame length, etc.), or other purposes.

Each of the MPDU sub-frames 410 may further include an MPDU 420, and optionally, a delimiter 422 and/or padding 424. The delimiter 422 may include information on MPDU length, cyclic redundancy checks (CRC), and/or a unique pattern. The padding 424 may include additional padding (e.g., 0 to 3 bytes) to compensate for different lengths of different MPDUs.

The MPDU 420 may include a MAC header 430, a frame body (e.g., MAC service data unit (MSDU) and/or aggregated MSDU (A-MDSU)) 435, and frame check sequence (FCS) 440, according to some embodiments. The A-MSDU 435 may include one or more A-MSDU subframes, where each A-MSDU subframe can include an A-MSDU subframe header, an MSDU, and a padding, according to some embodiments. According to some examples, the packets and/or frames communicated between the STA 120a and AP 110 or between two STAs 120 may be encoded within one or more MPDUs 420.

In some examples, the MAC header 430 may include fields such as, but not limited to, frame control, duration field, address(es) (e.g., one or more source addresses, one or more destination addresses, etc.), sequence control, quality of service (QoS) control field, and HT control as understood by a person of ordinary skill in art. The QoS control field may include a field indicating the traffic identifier (TID). In a non-limiting example, the TID field may include four bits. The TID can indicate the stream of frames to which MSDU 435 belongs. According to some embodiments, an electronic device (e.g., STA 120a) may transmit multiple streams of frames with different QoS requirements. The TID is used to differentiate between the multiple streams of frames. The QoS field may also include a queue size subfield indicating the buffer size (e.g., the number of bytes queued in a buffer.)

Figure 5:
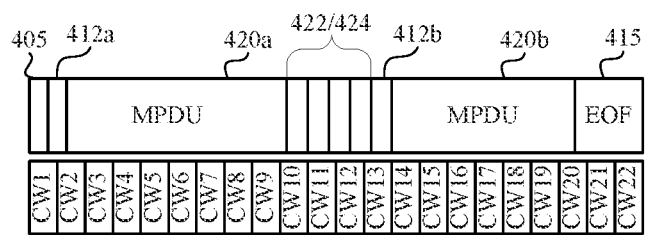

As further illustrated in FIG. 5, each of the preamble 405, A-MPDU headers 412, MPDU sub-frames (i.e., MPDUs 420, delimiters 422, and/or padding 424), and EOF padding 415 may associated with respective codewords CW 1-22.

Each of the TSTA 301 and the rSTA 303 may be configured to perform the MAC-based HARQ based on a minimum size requirement. For example, the rSTA 303 may be configured to determine whether any of the MPDU 420, delimiter 422, and/or padding 424 satisfies the minimum size requirement, i.e., is larger than the minimum size requirement. In some embodiments, the minimum size requirement may be a number of bytes in an A-MPDU header, e.g., four bytes, plus a minimum number of bytes, e.g., sixteen bytes or twenty-eight bytes, for an MPDU, MAC Management Payload unit (MMPDU), or a control frame, i.e. any frame that can be included in the A-MPDU. In some embodiments, the minimum size requirement may be, for example, twenty bytes when the TSTA 301 and/or the rSTA 303 is in a power save mode or thirty-two bytes in all other operating modes.

In some embodiments, when the rSTA 303 receives the data stream 305, at the PHY layer 213, the rSTA 303 may regenerate the MPDUs 420 based on the codewords CW 1-22. Using the PHY layer 213, the rSTA 303 may forward the MPDUs 420 to the MAC layer 211. In turn, the MAC layer 211 may determine whether any transmission failures occurred with respect to the MPDUs 420. To achieve this, the codewords CW 1-22 may contain a fixed number of bytes, such that the MAC layer 211 may calculate identify the MPDUs 420 based on the codewords CW 1-22 from the PHY layer 213. As discussed in greater detail below, the rSTA 303 may acknowledge the correctly received frames (e.g., MPDUs 420) in the block acknowledgement 307. The rSTA 303 may store any codewords associated with a frame that was not received correctly in a memory, e.g., memory 250 of FIG. 2. For example, the MPDU 420b may be a failed MPDU, and as such, the rSTA 303 may store codewords CW 14-20 that are associated with the MPDU 420b in a memory, e.g., the memory 250 of FIG. 2.

Additionally, the rSTA 303 may analyze any frames that are not acknowledged in the block acknowledgement 307 to determine whether the unacknowledged frames satisfy the minimum size requirement. In some embodiments, the unacknowledged frames may include padding, an empty A-MPDU sub-frame header, or any other frames that do not carry any valid data. The rSTA 303 may then store any codewords associated with the frames that were not acknowledged and are larger than the minimum size requirement in the memory. As one example, the delimiters 422 and/or padding 424 shown in FIG. 5 may be larger than the minimum size requirement, and as such, the rSTA 303 may store the codewords CW 10-13 that are associated with delimiters 422 and/or padding 424 in the memory 250. In some embodiments, the rSTA 303 may expect that the TSTA 301 will retransmit a codewords stored in the memory 250.

After determining which codewords are associated with portions of the data stream 305 that were properly received, the rSTA 303 may transmit the block acknowledgement 307 to the iSTA 301, as should be understood by those of ordinary skill in the art. For example, the block acknowledgement 307 may include information indicating which MPDUs 420 were correctly received, while omitting information on any padding or frame that is not possible to acknowledge using the block acknowledgment.

Figure 6:
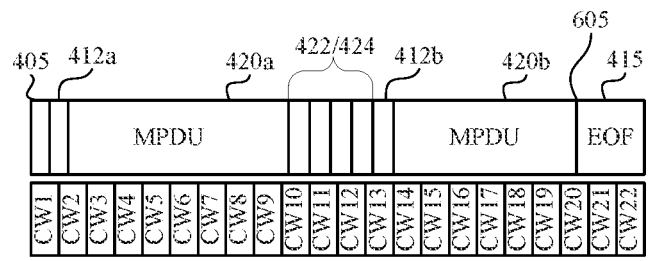

In some embodiments, the rSTA 303 may be configured to identify a codeword number when padding started, and may include a field in the block acknowledgement 307 indicating such codeword number. For example, as illustrated in FIG. 6, each of a preamble 405, A-MPDU headers 412, MPDU sub-frames (i.e., MPDUs 420, delimiters 422, and/or padding 424), and EOF padding 415 may be associated with respective codewords CW 1-22. In this example, the rSTA 303 may identify an EOF padding start 605 as being associated with codeword CW 20. Once the EOF padding start 605 is identified, the rSTA 303 may not store the codewords associated with the EOF padding 415, e.g., codewords CW 20-22, because the padding conveys no discernible information. The rSTA 303 may then indicate this codeword number, e.g., codeword CW 20, in the block acknowledgement 307. As a result, the TSTA 301 may not retransmit the codewords associated with the EOF padding 415. In some embodiments, the field added to the block acknowledgement 307 may be, for example, three bytes. In some embodiments, a value of the field added to the block acknowledgement 307 may be set to 0 to indicate that all of the codewords, e.g., codewords CW 0-22, were incorrectly received. In some embodiments, in the event that the EOF padding 415 is included an MPDU, the iSTA 301 may retransmit the codewords associated with the EOF padding 415 using a conventional ARQ retransmission, rather than a HARQ retransmission.

Based on the block acknowledgement 307, the iSTA 301 may identify which codewords were not acknowledged in the block acknowledgement 307. Additionally, the iSTA 301 may identify any unacknowledged frames that are larger than the minimum size requirement. The TSTA 301 may then map the unacknowledged frames that are larger than the minimum size requirement to codewords that carried the frames and retransmit the mapped codewords. Using the example above, based on the block acknowledgement 307, the iSTA 301 may determine that codewords CW 10-20 should be retransmitted to the rSTA 303. In some embodiments, as the iSTA 301 and the rSTA 303 may both be configured to execute retransmission protocols based on the minimum size requirement, the TSTA 301 and rSTA 303 may be synchronized with one another such that the iSTA 301 and rSTA 303 are both aware of the codewords that need to be retransmitted.

In some embodiments, the second data stream 309 may include retransmitted codewords, e.g., codewords CWs 10-20, and if the second data stream 309 is longer than the retransmitted codewords, e.g., codewords CW 10-20, then any codewords transmitted after the retransmitted codewords contain new data. However, if the second data stream 309 is shorter than the retransmitted codewords, then any codewords that did not fit into the second data stream 309 are not retransmitted. Alternatively, the second data stream may include information related to the one or more codewords to be retransmitted, such as encoding information.

Figure 7:
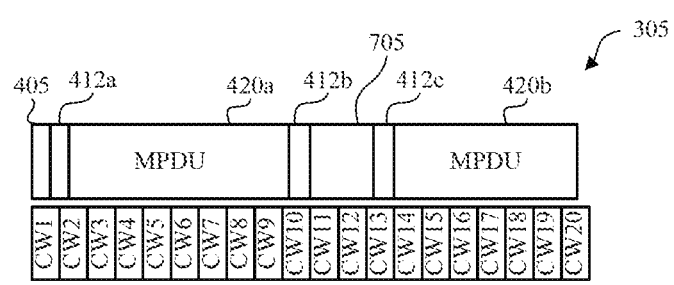

In order to reduce the number of retransmitted codewords due to, for example, delimiters 422 and/or padding 424 being less than the minimum size requirement, the iSTA 301 may also be configured to add a padding to the transmission. For example, as illustrated in FIG. 7, the data stream 305 may include a preamble 405, A-MPDU headers 412a-c, MPDUs 420a-b, and a padding 705. That is, the padding 705 may be added, along with the A-MPDU headers 412b, 412c, between MPDUs 720a-b to provide a buffer, rather than delimiters 422 and/or padding 424. The padding 705 may include dummy data that is acknowledged in the block acknowledgement 307, and as such, the codewords CW 10-13 associated with the padding 705 would not require retransmission.

In some embodiments, the rSTA 303 may be configured to recognize that the padding 705 includes a sequence number and to ignore the padding 705 accordingly. For example, the padding 705 may be a data frame having a subtype value, e.g., a four bit value, which indicates that the frame being transmitted is the padding 705, and therefore can be ignored in terms of retransmission. The sequence number of the padding 705 may be one of a plurality of sequence numbers used to identify different types of data transmitted by the iSTA 301. In some embodiments, the padding 705 may have its own sequence number counter that may be used in a multi-station block acknowledgement. In further embodiments, the sequence number may be based on the transmitted data. That is, the rSTA 303 may acknowledge the padding 705 in the block acknowledgement 307 without further processing the data. As a result, the iSTA 301 may not retransmit any codewords associated with the padding 705. By introducing the padding 705 that is acknowledged in the block acknowledgment, the iSTA 301 may reduce the number of retransmitted codewords.

Figure 8:
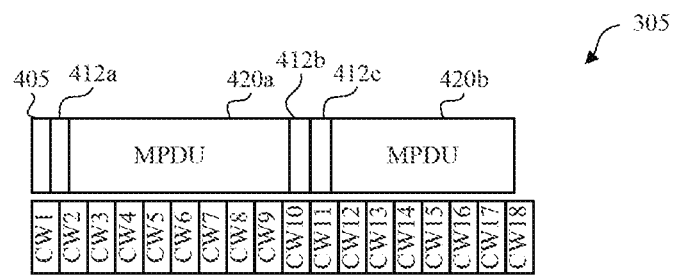

As another example to reduce the number of retransmitted codewords, the iSTA 301 may be configured to transmit consecutive A-MPDU headers in the data stream 305. For example, as illustrated in FIG. 8, the data stream 305 may include a preamble 405, A-MPDU headers 412a-c, and MPDUs 420a-b. As shown in FIG. 8, the A-MPDU header 412b may be added between the MPDU 420a and the A-MPDU header 412c, so that A-MPDU headers 412b-c are consecutive. While the size of the consecutive A-MPDU headers 412b-c may be less than the minimum size requirement, the rSTA 303 may be configured to determine that an MPDU would not fit in between the consecutive A-MPDU headers 412b-c, and as such, the rSTA 303 may be configured to acknowledge the A-MPDU headers 412b-c in the block acknowledgment 307. As a result, codewords CW 10-11 associated with the A-MPDU header 412b would not require retransmission.

Figure 9:
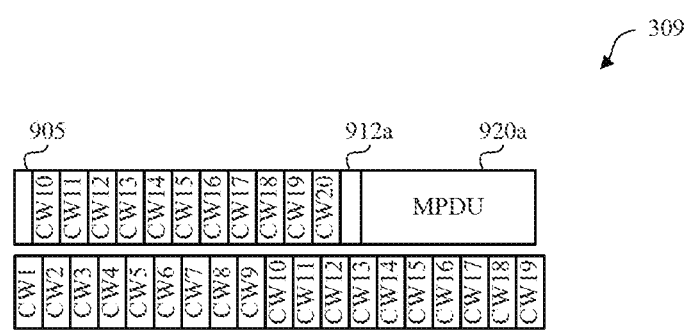

After determining which codewords are to be retransmitted, the iSTA 301 may transmit the second data stream 309 to the rSTA 303. In some embodiments, the second data stream 309 may include information based on the established HARQ format between the iSTA 301 and the rSTA 303. That is, the iSTA 301 and rSTA 303 may use the ADDTS signaling to establish the HARQ retransmission format to be used. For example, the HARQ retransmission format may use a soft combining method or an incremental redundancy method. In the soft combining method, the iSTA 301 may retransmit codewords having the same content as the originally transmitted codewords, and the rSTA 303 may combine the originally transmitted codewords with the retransmitted codewords. For example, as shown in FIG. 9, the second data stream 309 may include a preamble 905, retransmitted codewords CW 10-20, an A-MPDU header 912a, and a MPDU 920a, which is a new MPDU relative to MPDUs 420. As further shown in FIG. 9, the preamble 905, retransmitted codewords CW 10-20, the A-MPDU header 912a, and the MPDU 920a may be represented by new codewords CW 1-19. In some embodiments, the retransmitted codewords CW 10-20 may be transmitted before any new data in the second data stream 309. Furthermore, the retransmitted codewords CW 10-20 may be retransmitted in the same transmission order as in the data stream 305, such that the rSTA 303 is aware of the sequence of the retransmitted codewords. In this way, the rSTA 303 may more efficiently replace the failed codewords stored in the memory 250. Alternatively, in further embodiments, the iSTA 301 may include a header in the preamble 905 that maps the retransmitted codewords to the failed codewords. In some embodiments, to reduce memory consumption, the iSTA 301 may be configured to attempt a single retransmission of a failed codeword of a previous transmission.

In some embodiments, the iSTA 301 may also be configured to include a transmission order field in the preamble of the second data stream 309. The transmission order field may indicate that the MPDUs are aggregated in an increasing sequence order. For example, the transmission order field may be set to 1, and the MPDUs may be sequentially numbered, such that the rSTA 303 may identify an order in which the MPDUs were transmitted.

In some embodiments, the second data stream 309 may include a retransmission field in the preamble 905 to indicate whether the MPDU contains no HARQ retransmitted codewords, all of the codewords to be retransmitted, or a shortened set of the codewords to be retransmitted. For example, a first value of the retransmission field, e.g., "0," may indicate that the MPDU contains no HARQ retransmitted codewords, a second value of the retransmission field, e.g., "1," may indicate that the MPDU contains all of the codewords to be retransmitted, and a third value of the retransmission field, e.g., "2," may indicate that the MPDU contains a subset of the codewords to be retransmitted. In some embodiments, the retransmission field having the first value may be used to stop any HARQ retransmissions.

Figure 10:
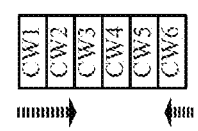

In some embodiments, the subset of codewords to be retransmitted may be based on eliminating one or more codewords to be retransmitted, e.g., one or more codewords at a beginning of the codewords to be retransmitted and a last codeword of the codewords to be retransmitted. To achieve this, the TSTA 301 may analyze the data stream 305 and the block acknowledgement 307 to determine the codewords to be retransmitted in the second data stream 309. For example, as illustrated in FIG. 10, the iSTA 301 may determine that six codewords, e.g., codewords CW 1-6, are to be retransmitted based in part on the block acknowledgement 307. The iSTA 301 may truncate the codewords to be retransmitted by canceling the retransmission of, for example, a first two of the codewords, e.g., codewords CW 1-2. It should be understood by those of ordinary skill in the arts that more or less than the first two codewords may be canceled from the retransmission. In some instances, the codewords CW 1-2 may be retransmitted codewords that have failed multiple transmissions, where the number of failed transmissions is greater than a predetermined threshold. In some embodiments, the threshold for the number of failed transmissions may be any number and may be controlled by the iSTA 301. Thus, canceling retransmission of these codewords may reduce processing demands by eliminating codewords that are unlikely to be successfully transmitted. The last codeword, e.g., codeword 6, may be canceled from the retransmission to avoid retransmissions of codewords containing padding at the end of the data stream 305. For example, in some instances, the rSTA 303 may not have detected the padding or the block acknowledgement 307 may not have contained the field to signal the codeword when the padding started.

In some embodiments, the preamble of the second data stream 309 may include a first parameter indicating how many of the first codewords have been canceled and a second parameter indicating whether the last codeword has been canceled. Using the example shown in FIG. 10, the first parameter may indicate that the first two codewords CW 1-2 have been canceled and the second parameter may indicate that the last codeword CW 6 has been canceled. As a result, the iSTA 301 may retransmit codewords CW 3-5, as shown in FIG. 10. In this way, the rSTA 303 may be notified about which codewords are being retransmitted and which codewords have been canceled from the retransmission. Alternatively, the preamble of the second data stream 309 may include a symbol that includes having a first retransmitted codeword field and a last retransmitted codeword field. For example, the symbol may include 14 bits, with 7 bits allocated for the first retransmitted codeword field and 7 bits allocated for the last retransmitted codeword field. The first retransmitted codeword field may be a value of the first retransmitted codeword, e.g., a second codeword of the codewords to be retransmitted, a third codeword of the codewords to be retransmitted, etc., and the last retransmitted codeword field may be the total number of codewords being retransmitted, thereby indicating the value of the last retransmitted codeword field.

In the incremental redundancy method, the iSTA 301 may include additional LDPC encoding information related to the transmitted codewords, and the rSTA 303 may combine the LDCP encoding information with the previously received codewords, which results in codewords with a lower coding level, i.e., there is LDPC encoding from both the original transmission and retransmission. Additionally, with the incremental redundancy method, the PPDU preamble that carries the incremental redundancy retransmission data may contain a new LDPC coding rate, which the codewords will have after combining the LDPC encoding from the original transmission and the retransmission. Thus, the number of bits transmitted in the retransmissions may be a difference of the LDPC encoding bits in a previous LDPC code rate and the new LDPC code rate. The new LDPC encoding in the retransmitted codewords may be in the beginning of the PPDU. In some embodiments, one retransmitted codeword may contain LDPC encoding for multiple retransmitted code words, and a last codeword may contain LDPC encoding that is padded to multiple codewords, so that new data after the retransmission starts from the next codeword.

After receiving the second data stream 309, the rSTA 303 may combine the retransmitted codewords or information related to the codewords according to the HARQ format. For example, the rSTA 303 may analyze the retransmitted codewords to determine if the retransmitted codewords were properly received, and when properly received, the rSTA 303 may combine the retransmitted codewords with the previously received data and delete the previously stored codewords from the memory. Additionally, the rSTA 303 may analyze any new data using the techniques described herein to identify frames that were properly received and whether any unacknowledged frames satisfy the minimum size requirement, as discussed herein. The rSTA may then transmit the second block acknowledge 311 using the techniques described herein.

In embodiments, the frame formats described above in FIGS. 4-10 can be formulated, at least in part, by the MAC layer 211 and/or the PHY layer 213 in the processor 210.

Figure 11:
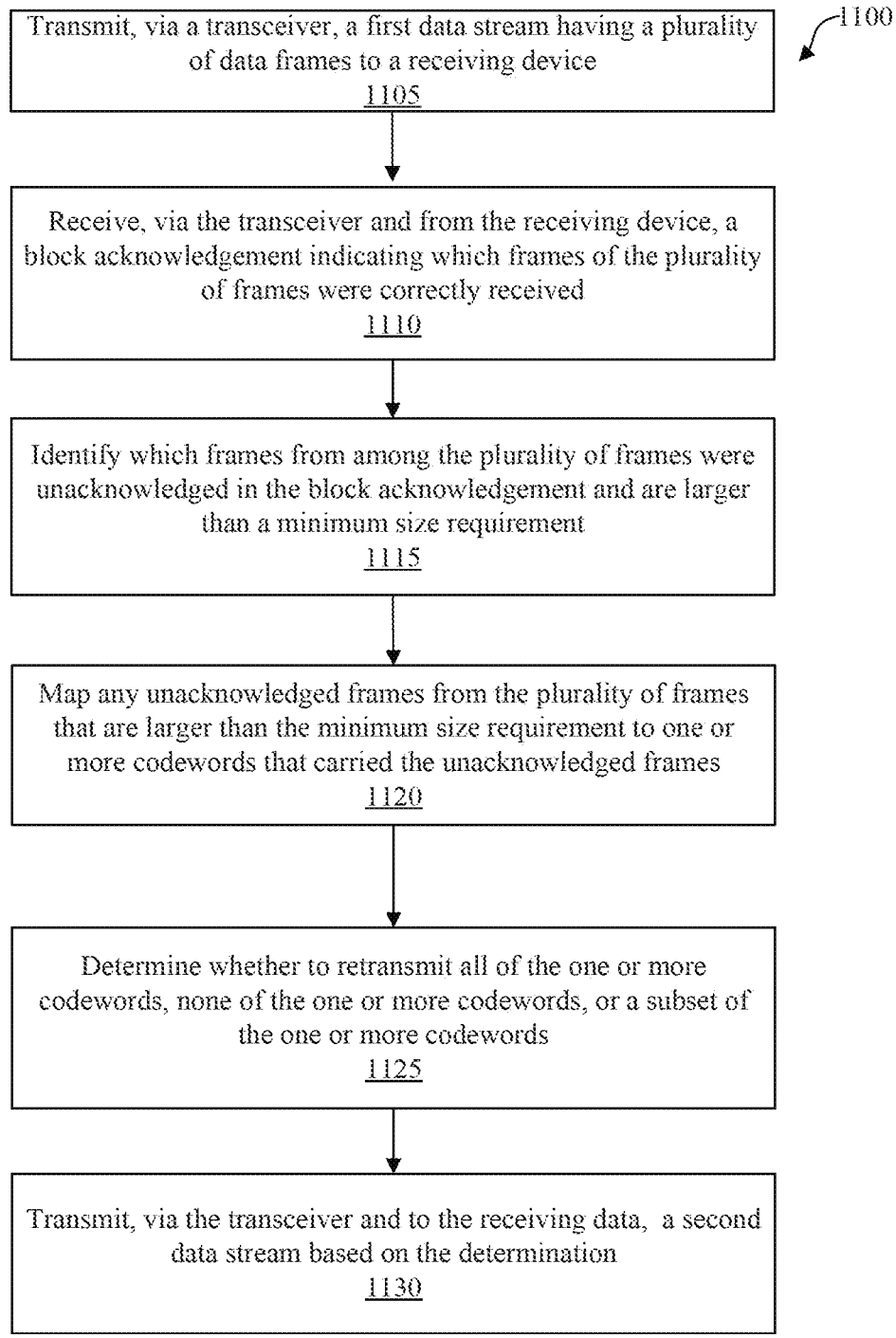
FIGS. 11 and 12 illustrate example methods for implementing a MAC-based HARQ, according to some embodiments of the disclosure.

FIG. 11 illustrates an example method for implementing a MAC-based HARQ, according to some embodiments of the disclosure. A method 1100 may represent the operation of a transmitting device, e.g., iSTA 301 of FIG. 3 implementing the MAC-based HARQ. The method 1100 may also be performed by system 200 of FIG. 2 and/or computer system 1300 of FIG. 13. But method 1100 is not limited to the specific embodiments depicted in those figures and other systems may be used to perform the method as will be understood by those skilled in the arts. It is to be appreciated that not all operations may be needed, and the operations may not be performed in the same order as shown in FIG. 11.

In 1105, a transmitting device (e.g., iSTA 301 of FIG. 3), may transmit, via a transceiver (e.g., transceiver 220) a first data stream having a plurality of frames to a receiving device. In 1110, the transmitting device may also receive, via the transceiver and from the receiving device, a block acknowledgement indicating which frames of the plurality of frames were correctly received. In 1115, the transmitting device may identify which frames from among the plurality of frames were unacknowledged in the block acknowledgement and are larger than a minimum size requirement. In 1120, the transmitting device may map any unacknowledged frames from the plurality of frames that are larger than the minimum size requirement to one or more codewords that carried the unacknowledged frames.

In 1125, the transmitting device may determine whether to retransmit all of the one or more codewords, none of the one or more codewords, or a subset of the one or more codewords. For example, the transmitting device may determine not retransmit any of codewords if all of the MPDUs, e.g., the MPDUs 420 of FIG. 4, were acknowledged in the block acknowledgement, and the unacknowledged frames include a padding frame that is longer than the minimum size requirement. Alternatively, the transmitting device may determine that a legacy retransmission protocol may be more efficient to retransmit the one or more codewords, or if reception of all MPDUs have failed and it is not likely to benefit from combination of the retransmission and transmission. As another alternative, the transmitting device may determine to retransmit a subset of retransmitted codewords. For example, a first codeword may have been retransmitted multiple times, and the transmitting device may determine that a legacy protocol, e.g., an ARQ retransmission, may be more efficient to retransmit the first codeword. Additionally, the transmitting device may determine that a last codeword may be padding, and as such, may not require retransmission. In 1130, the transmitting device may transmit, via the transceiver and to the receiving device, a second data stream based on the determination.

Figure 12:
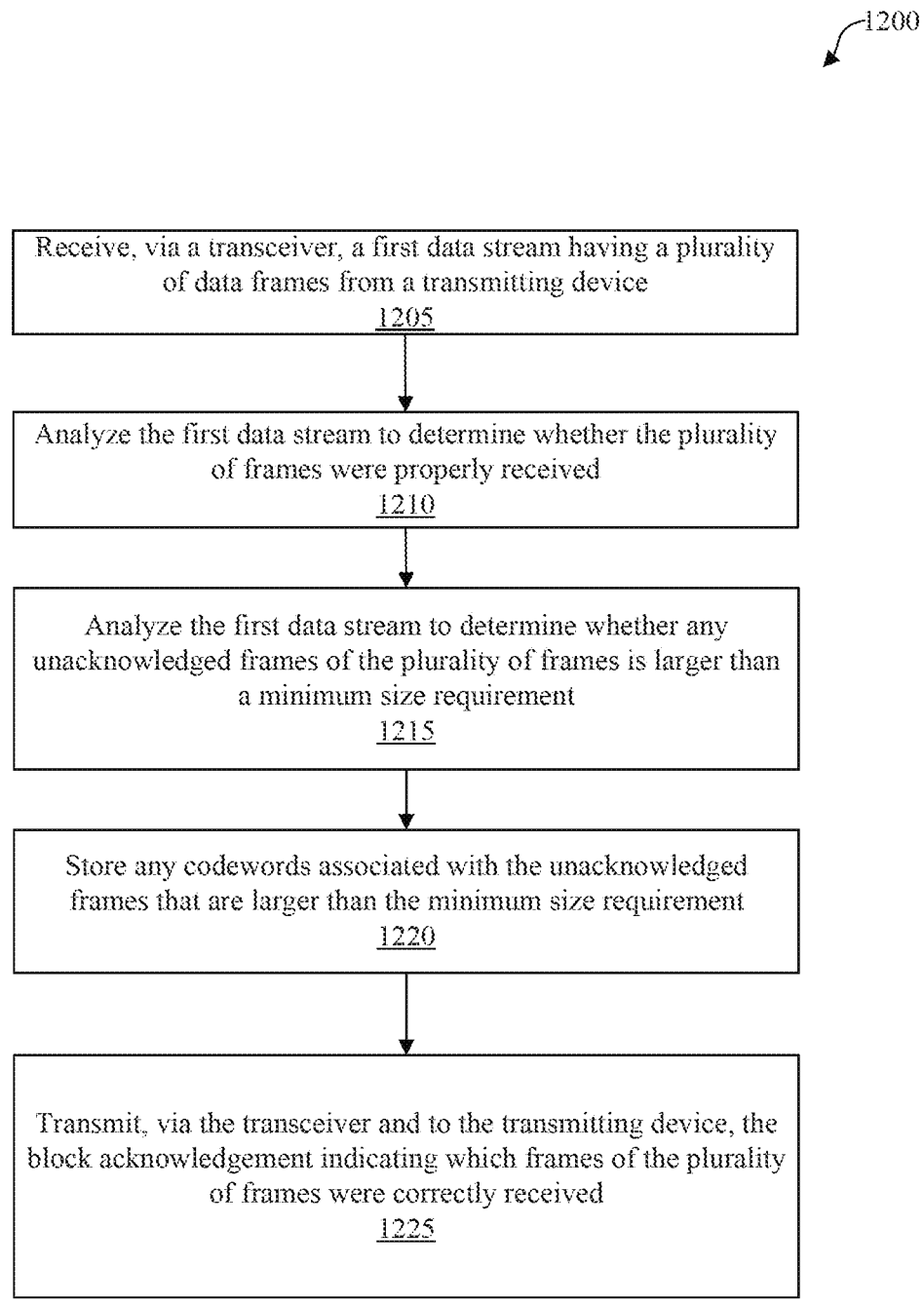

FIG. 12 illustrates an example method for implementing a MAC-based HARQ, according to some embodiments of the disclosure. A method 1200 may represent the operation of a receiving device, e.g., rSTA 303 of FIG. 3 implementing the MAC-based HARQ. The method 1200 may also be performed by system 200 of FIG. 2 and/or computer system 1300 of FIG. 13. But method 1200 is not limited to the specific embodiments depicted in those figures and other systems may be used to perform the method as will be understood by those skilled in the arts. It is to be appreciated that not all operations may be needed, and the operations may not be performed in the same order as shown in FIG. 12.

In 1205, a receiving device (e.g., rSTA 303 of FIG. 3), may receive, via a transceiver (e.g., transceiver 220 of FIG. 2), a first data stream having a plurality of data frames from a transmitting device. In 1210, the receiving device may analyze the first data stream to determine whether the plurality of data frames was properly received. In 1215, the receiving device may analyze the first data stream to determine whether any unacknowledged frames of the plurality of frames is larger than a minimum size requirement. In 1220, the receiving device may store any codewords associated with the unacknowledged frames that are larger than the minimum size requirement. For example, the receiving device may store the codewords in a memory, e.g., memory 250 of FIG. 2. In 1225, the receiving device may transmit, via the transceiver and to the transmitting device, a block acknowledgement indicating which frames of the plurality of frames were correctly received.

Figure 13:
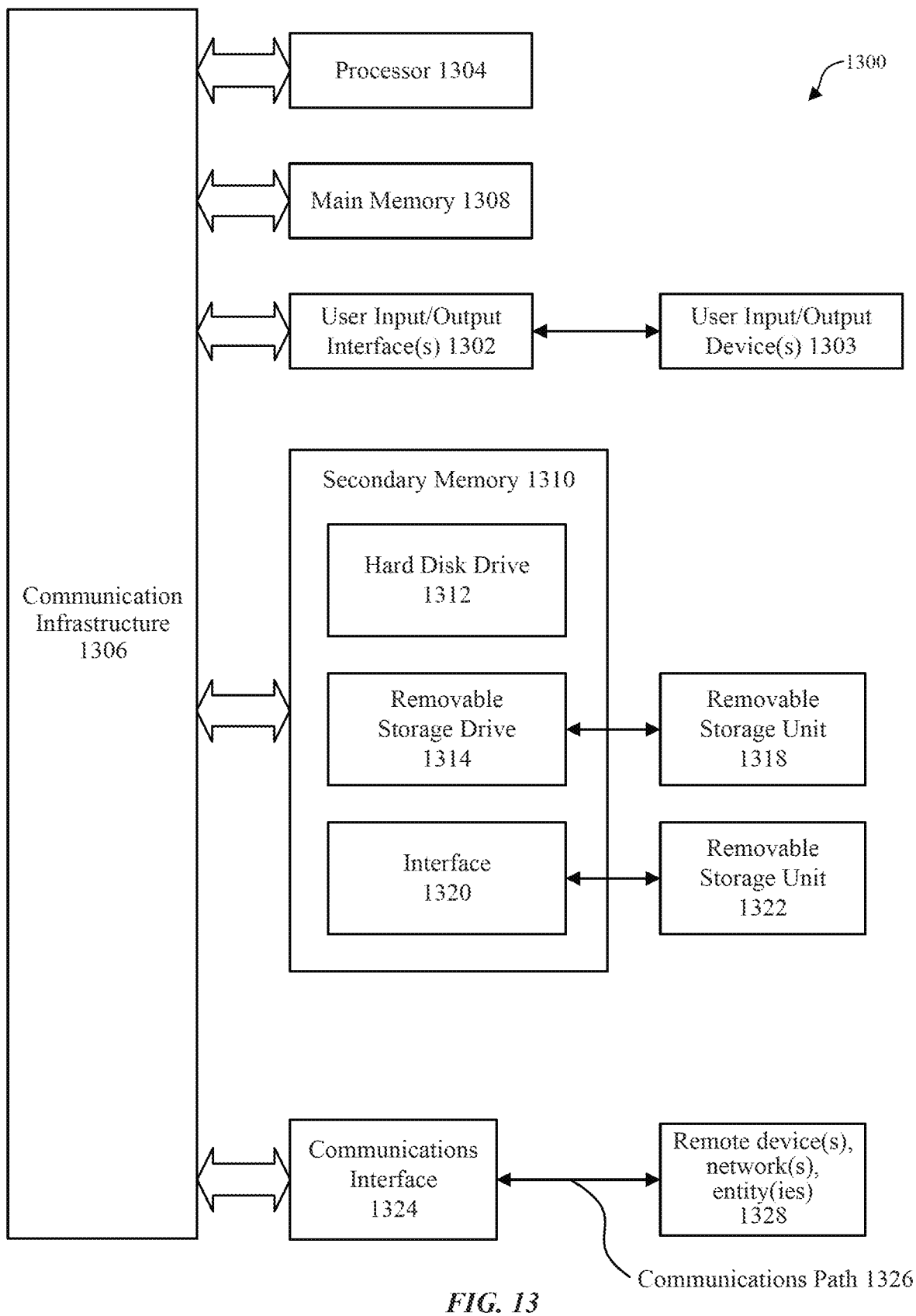
FIG. 13 is an example computer system for implementing some embodiments or portion(s) thereof.

Various embodiments can be implemented, for example, using one or more computer systems, such as computer system 1300 shown in FIG. 13. Computer system 1300 can be any well-known computer capable of performing the functions described herein such as devices 110, 120 of FIG. 1, or 200 of FIG. 2. Computer system 1300 includes one or more processors (also called central processing units, or CPUs), such as a processor 1304. Processor 1304 is connected to a communication infrastructure 1306 (e.g., a bus.) Computer system 1300 also includes user input/output device(s) 1303, such as monitors, keyboards, pointing devices, etc., that communicate with communication infrastructure 1306 through user input/output interface(s) 1302. Computer system 1300 also includes a main or primary memory 1308, such as random access memory (RAM). Main memory 1308 may include one or more levels of cache. Main memory 1308 has stored therein control logic (e.g., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to some embodiments, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1300, main memory 1308, secondary memory 1310 and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 13. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A transmit device, comprising:
a transceiver configured to communicate over a wireless network; and
one or more processors communicatively coupled to the transceiver and configured to:
transmit, via the transceiver, a first data stream having a plurality of frames to a receive device;
receive, via the transceiver and from the receive device, a block acknowledgement indicating which frames of the plurality of frames were correctly received;
identify which frames from among the plurality of frames were unacknowledged in the block acknowledgement and are larger than a minimum frame size requirement;
map any unacknowledged frames from the plurality of frames that are larger than the minimum frame size requirement to one or more codewords that carried the unacknowledged frames;

determine whether to retransmit all of the one or more codewords, none of the one or more codewords, or a subset of the one or more codewords; and transmit, via the transceiver and to the receive device, a second data stream based on the determination.

2. The transmit device of claim 1, wherein the minimum frame size requirement is a size of an aggregated media access protocol data unit (A-MPDU) header plus a minimum number of bytes for a frame of an A-MPDU.

3. The transmit device of claim 1, wherein the minimum frame size requirement is twenty bytes when at least one of the transmit device or the receive device is in a power save mode.

4. The transmit device of claim 1, wherein the minimum frame size requirement is thirty-two bytes.

5. The transmit device of claim 1, wherein the first data stream comprises a padding to provide a buffer between adjacent media access control protocol data units (MPDUs).

6. The transmit device of claim 5, wherein the padding comprises dummy data that is acknowledged in the block acknowledgement.

7. The transmit device of claim 1, wherein the first data stream comprises consecutive aggregated media access protocol data unit (A-MPDU) headers, and wherein the block acknowledgement acknowledges the consecutive A-MPDU headers.

8. The transmit device of claim 1, wherein, in response to determining that all of the one or more codewords are to be retransmitted, the second data stream comprises all of the one or more codewords or information related to all of the one or more codewords.

9. The transmit device of claim 8, wherein the one or more codewords are transmitted in the second data stream before any new data frames in the second data stream.

10. The transmit device of claim 8, wherein the one or more codewords are retransmitted in the second data stream in a same transmission order as in the first data stream.

11. The transmit device of claim 8, wherein the information related to the one or more codewords comprises encoding information related to the one or more codewords.

12. The transmit device of claim 1, wherein the second data stream comprises a retransmission field in a preamble indicating whether the second data stream includes all of the one or more codewords, none of the one or more codewords, or a subset of the one or more codewords.

13. The transmit device of claim 12, wherein to determine whether to transmit all of the one or more codewords, none of the one or more codewords, or the subset of the one or more codewords, the one or more processors are further configured to:

determine whether any codewords from the one or more codewords have failed multiple transmissions to the receive device; and cancel at least one codeword from the one or more codewords that has failed multiple transmissions to the receive device, and wherein the retransmission field indicates that the second data stream includes the subset of the one or more codewords.

14. The transmit device of claim 12, wherein to determine whether to transmit all of the one or more codewords, none of the one or more codewords, or the subset of the one or more codewords, the one or more processors are further configured to:

determine whether a last codeword of the one or more codewords is associated with a padding; and cancel the last codeword when the last codeword is associated with the padding, and wherein the retransmission field indicates that the second data stream includes the subset of the one or more codewords.

15. The transmit device of claim 12, wherein, in response to determining to transmit the subset of the one or more codewords, the transmission field indicates that the second data stream includes the subset of the one or more codewords, and wherein the preamble further comprises a first parameter indicating how many codewords have been canceled and a second parameter indicating whether a last codeword of the one or more codewords has been canceled.

16. The transmit device of claim 12, wherein, in response to determining to transmit the subset of the one or more codewords, the transmission field indicates that the second data stream includes the subset of the one or more codewords, and wherein the preamble further includes a symbol having a first retransmitted codeword field indicating a value of the first retransmitted codeword and a last retransmitted codeword field indicating a total number of codewords being retransmitted.

17. A receive device, comprising:
a transceiver configured to communicate over a wireless network; and
one or more processors communicatively coupled to the transceiver and configured to:
receive, via the transceiver, a first data stream having a plurality of data frames from a transmit device;
analyze the first data stream to determine whether the plurality of frames were properly received;
analyze the first data stream to determine whether any unacknowledged frames of the plurality of frames are larger than a minimum size requirement;
store any codewords associated with the unacknowledged frames that are larger than the minimum size requirement; and
transmit, via the transceiver and to the transmit device, a block acknowledgement indicating which frames of the plurality of frames were correctly received.

18. The receive device of claim 17, wherein the first data stream comprises consecutive aggregated media access protocol data unit (A-MPDU) headers, and wherein the block acknowledgement acknowledges the consecutive A-MPDU headers.

19. The receive device of claim 17, wherein the one or more processors are further configured to identify a codeword number associated with when an end-of-frame started, and wherein the block acknowledgement comprises a field indicating the codeword number associated with when the end-of-frame started.

20. The receive device of claim 19, wherein the field indicating the codeword number associated with when the end-of-frame started is three bytes.

* * * * *